F. R. SHELDON.
AUTOMATIC COUPLING FOR SIGNAL, AIR, AND STEAM BETWEEN CARS.
APPLICATION FILED NOV. 11, 1910.
990,070.
Patented Apr. 18, 1911
2 SHEETS—SHEET 1.
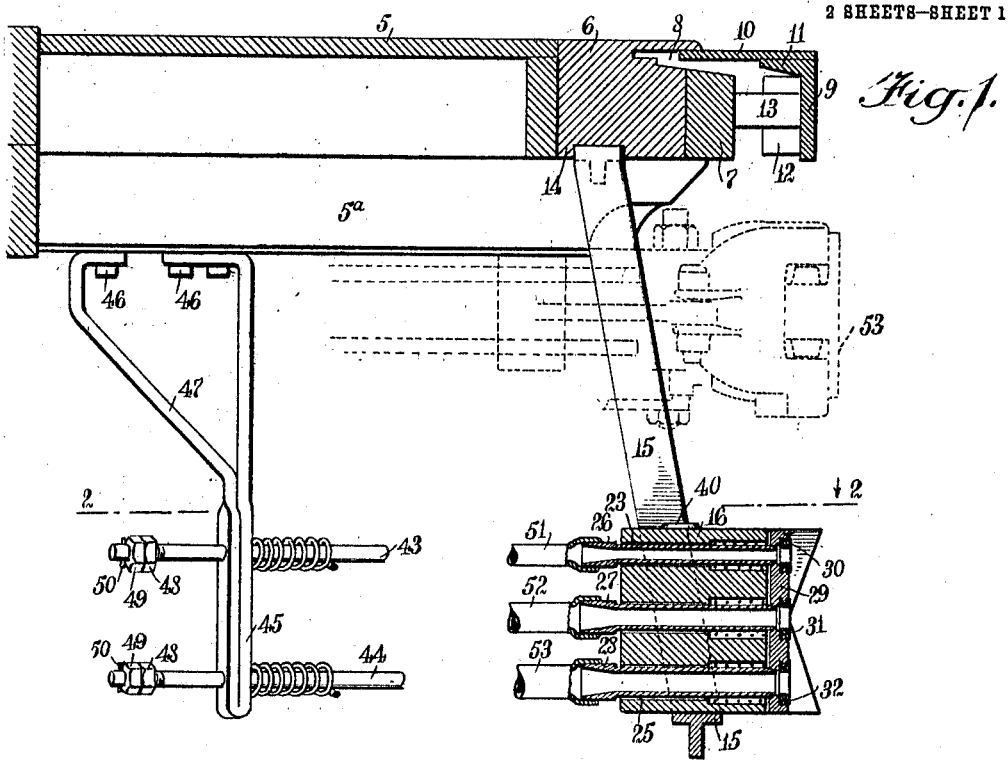
Fig. 1.
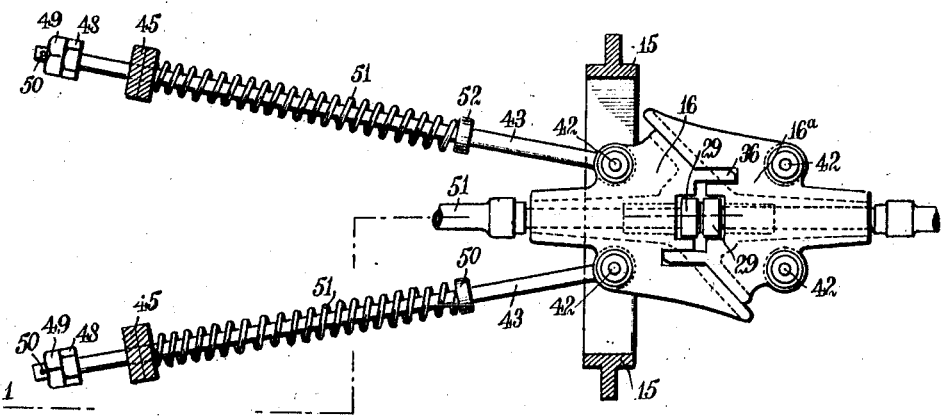
Fig. 2.
WITNESSES
Geo. W. Naylor
Walton Harrison
INVENTOR
Forrest Richard Sheldon
BY 
ATTORNEYS F. R. SHELDON.
AUTOMATIC COUPLING FOR SIGNAL, AIR, AND STEAM BETWEEN CARS.
APPLICATION FILED NOV. 11, 1910.
990,070.
Patented Apr. 18, 1911.
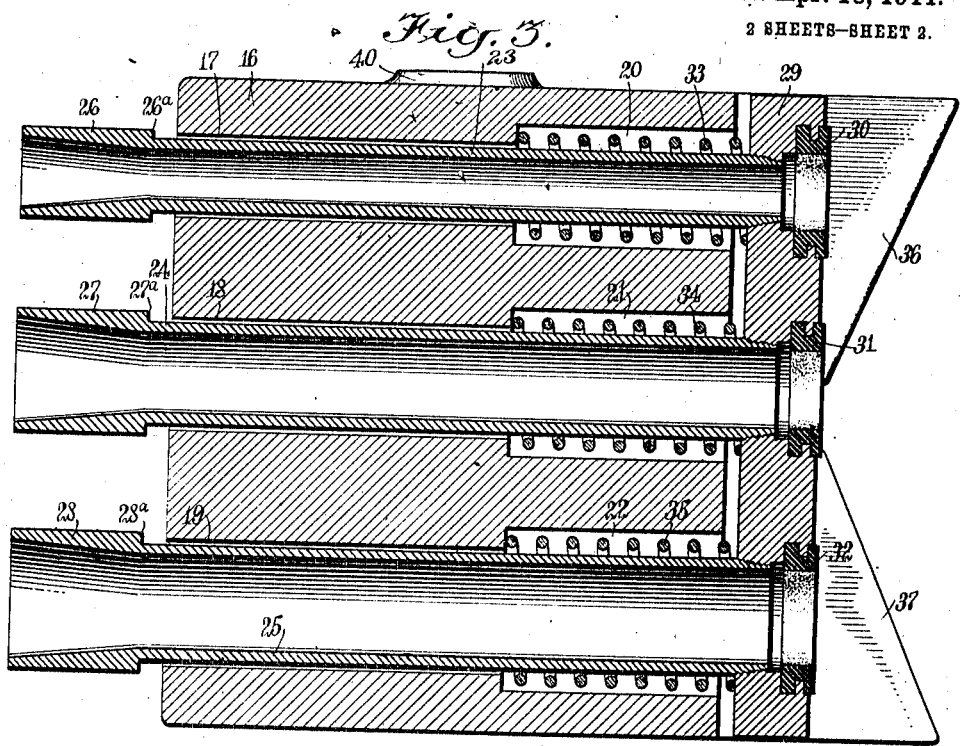
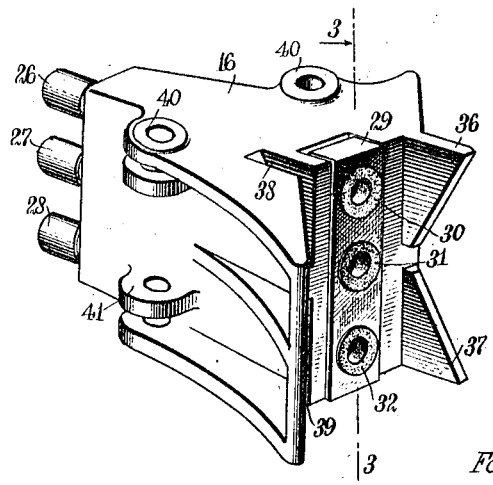
WITNESSES
INVENTOR
Forrest Richard Sheldon
BY
ATTORNEYS

UNITED STATES PATENT OFFICE.

FORREST RICHARD SHELDON, OF NEW HAVEN, CONNECTICUT.

AUTOMATIC COUPLING FOR SIGNAL, AIR, AND STEAM BETWEEN CARS.

990,070.

Specification of Letters Patent. Patented Apr. 18, 1911.

Application filed November 11, 1910. Serial No. 591,846.

*To all whom it may concern:*

Be it known that I, FORREST RICHARD SHELDON, a citizen of the United States, and a resident of New Haven, in the county of New Haven and State of Connecticut, have invented a new and Improved Automatic Coupling for Signal, Air, and Steam Between Cars, of which the following is a full, clear, and exact description.

My invention relates to automatic couplings of the kind used between cars for automatically making connections relative to the transmission of signals, and also the passage of steam, air and the like from one car to another.

More particularly stated, my invention comprehends a pair of coupling heads provided with pipe sections extending loosely through it, each coupling head being further provided with spring mechanism for holding the respective pipes in predetermined normal positions, so as to allow them to yield relatively to the coupling head carrying them during the act of coupling.

My invention further relates to improvements generally in couplings used for the purpose above indicated, the purpose of said improvements being to improve the general efficiency of said coupling.

Reference is to be had to the accompanying drawings forming a part of this specification, in which similar characters of reference indicate corresponding parts in all the figures.

Figure 1 is a view partly in side elevation and partly in section, on the line 1 of Fig. 2, looking toward the top of the sheet, and showing my improved coupling as mounted upon one end of a car; Fig. 2 is a horizontal section on the line 2—2 of Fig. 1, looking in the direction of the arrow; and showing the addition of the mating coupling member carried by another car; Fig. 3 is an enlarged vertical section through the coupling head; and Fig. 4 is a perspective of the coupling head.

At 5 is a car platform supported upon beams 5ᵃ which extend lengthwise of the car. At 6 is a head block carrying a head plate 7. The head block and head plate are together provided with a slot 8, as will be understood from Fig. 1. At 9 is a buffer plate which is provided with a tongue 10 extending into the slot 8, the buffer plate 9 being further provided with a portion 11 supporting the tongue 10 and with other portions, one of which is shown at 12, by aid whereof the buffer plate is guided and otherwise held in position. The buffer plate 9 is mounted in buffer rods 13 which extend through the head plate 7 and head block 6, so as to allow the buffer plate more or less play relatively to the head block. The head block 6 is provided upon its under side with a slot 14 and connected with the head block and extending from this slot is a stirrup 15 having substantially a U-form, as will be understood from Figs. 1 and 2.

At 16, 16ᵃ are two coupling heads mating each other, and as they are of identical construction, only one of them will be described. The coupling head 16 is provided with a number of separate passages 17, 18, 19, each of substantially cylindrical form, the passages 18, 19 having successively greater diameters than the passage 17, as will be understood from Fig. 3. The coupling head 16 is further provided with a number of other passages 20, 21, 22, also of substantially cylindrical form, these passages merging into the passages 17, 18, 19 and being of slightly greater diameter than the latter. The passages 17, 20 constitute together practically a single passage having portions of different diameter and extending longitudinally through this passage is a tube 23. Another tube 24 having a diameter slightly greater than the tube 23 extends through the passage 18, 21 which likewise constitute practically a single passage. Similarly the passages 19, 22 constitute in substance a single passage through which extends a tube 25 of still greater diameter. The tubes 23, 24, 25 are respectively provided with portions 26, 27, 28 of increased diameter, these portions respectively terminating in annular shoulders 26ᵃ, 27ᵃ, 28ᵃ which are adapted to engage adjacent portions of the coupling head 16.

At 29 is a perforated plate to which the several tubes 23, 24, 25 are secured. The plate 29 is provided with annular gaskets 30, 31, 32 concentric to the tubes 23, 24, 25 and substantially in registry therewith, as will be understood from Fig. 3. A number of spiral or compression springs 33, 34, 35 are fitted neatly around the tubes 23, 24, 25, and are lodged severally in the cylindrical passages 20, 21, 22. These springs engage the adjacent surfaces of the plate 29 and tend to force this plate slightly away from the coupling head 16. This coupling head is provided with tongues 36, 37, each having a substantially triangular form, as indicated in Fig. 4. The coupling head is further provided with slots 38, 39 each of a substantially triangular form and disposed as indicated in Fig. 4.

When two of the coupling heads 16, 16ª are placed together as indicated in Fig. 2, the tongues 26 of one coupling head fit into the slots 38 of the other coupling head, and vice versa, thereby fitting the two heads neatly together. Each coupling head is provided with bearings 40, 41 and extending through these bearings are pivot pins 42. Guide rods 43, 44 are secured to these pins and extend radially backward from the coupling head, as will be understood from Figs. 1 and 2.

At 45 are brackets which are, by aid of bolts 46, secured upon the beams 5ª, or at some other appropriate point upon the framework. The guide rods 43 extend loosely through the brackets 45 which for this purpose are provided with holes. The brackets 45 are in this instance made of angle iron bent back upon itself and provided with integral portions 47 which serve as braces. The ends of the guide rods 43 opposite the coupling head 16 are threaded and are fitted with nuts 48, 49. The nut 48 may be turned and thereby, within certain limits, adjusted at the will of the operator; and when this is done, the nut 49 is tightened against the nut 48, thereby locking it firmly in position. Cotter pins 50 extend through the ends of the guide rods 43 and prevent the nuts 48, 49 from being lost accidentally.

The tube 23 is associated with the so-called "signal pipe" used in railway trains.
The signal pipe is usually quite small and on that account I make the tube 23 of comparatively small diameter. The tubes 24, 25 are associated respectively with the air pipe and the steam pipe, the tube 25 being of larger diameter than the tube 24 for the reason that the steam pipe is generally given a greater diameter than the air pipe. The various pipes used for signal, air and steam are respectively connected with the several portions 26, 27 and 28 of enlarged diameter, and thus made practically continuous with the respective tubes 23, 24, 25.

Whenever the plate 29 is pressed toward the coupling head 16 the various springs 23, 24, 25 are slightly compressed. When two coupling heads (for example, 16, 16ª, Fig. 2) are pressed together, so that the tongues 36, 37 enter the respective slots 38, 39, as above described, the gaskets 30, 31, 32 carried by the plate 29 of one coupling head engage the corresponding gaskets carried by the plate 29 of the other coupling head, and thus form gastight connections between the respective gaskets thus forced together. The coupling up of any two coupling heads 16, 16ª, therefore causes the tubes 23, 24, 25 of one coupling head to practically become continuous with the similar tubes carried by the other coupling head. The pressure of the various springs 33, 34, 35, acting against the plate 29, as above described, causes each gasket 30, 31, 32 to be pressed tightly and constantly against the corresponding or mating gasket carried by the other coupling head, so that the connection from each tube 23, 24, 25 to the corresponding tube carried by the other coupling head is rendered continuous and reliable so long as the two coupling heads are joined together.

At 51 are spiral springs which encircle the guide rods 43. At 52 are set collars carried by the guide rods and engaged by the adjacent ends of the springs 51. These springs at their other ends bear respectively against the brackets 45. The tendency of the springs 51 is to force the guide rods 43 to the right according to Figs. 1 and 2. This causes the coupling head 16 to normally protrude slightly beyond the stirrup 15 associated with it. When, however, two cars are brought together as above described, so that the gaskets 30, 31, 32 of the coupling head carried by one car jam against the mating gaskets of the coupling head carried by the other car, the springs 51 are compressed, the guide rods 43 are driven back, the coupling head 16 moves slightly in relation to the stirrup 15, and the plate 29 carrying the various tubes 23, 24, 25 is driven slightly to the left according to Fig. 2.
At 53 is shown an ordinary coupling for securing the cars together in the usual manner. The parts are so proportioned that before the ordinary coupling locks, the coupling heads associated with tubes 23, 24, 25 are pushed back a little relatively to the stirrups 15; or, in other words, the springs 51 are compressed, the guide rod 43 protruding a little through the brackets 45.

The operation of my device is as follows:
A car being equipped with coupling heads 16, 16ª at its opposite ends, and being coupled in the usual manner with another car, the mere pushing together of the two cars causes the coupling head 16 of one car to engage the coupling head 16ª of the other car, the various pipes 51, 52, 53 of one car being thus practically coupled to the corresponding pipes of the other car.

The device may be used with air, or steam, or signal, or with all or any two of them.

Having thus described my invention, I claim as new and desire to secure by Letters Patent:

1. The combination of a coupling head provided with a tongue extending therefrom, and further provided with a slot for receiving a tongue from another coupling head, said first-mentioned coupling head being further provided with passages extending through it, tubes extending through said passages and removable relatively to said first-mentioned coupling head, a plate connected with said tubes, and means for forcing said plate slightly away from said coupling head, thereby moving said tubes relatively to the latter.

2. The combination of a coupling, a head provided with a passage having both a small diameter and a larger diameter, a tube extending through said passage and provided with a shoulder for engaging the adjacent surface of said coupling head, a spring disposed within said passage of larger diameter, and a plate engaging said spring and movable relatively to said coupling head.

3. The combination of a coupling, a head provided with a passage having both a small diameter and a larger diameter, a tube extending through said passage and provided with a shoulder for engaging the adjacent surface of said coupling head, a spring disposed within said passage of larger diameter, a plate engaging said spring and movable relatively to said coupling head, and a gasket carried by said plate and secured to the adjacent end of said tube.

4. The combination of a coupling head provided with passages extending entirely through it, a plurality of tubes extending through said passages, one of said tubes having greater diameter than another, a plate mounted upon all of said tubes, and gaskets carried by said plate and disposed in substantial registry with said tubes.

5. The combination of a coupling head provided with passages extending entirely through it, a plurality of tubes extending through said passages and provided with shoulders, one of said tubes having a diameter greater than another, a plate connected with all of said tubes and provided with openings in registry with said tubes, and spring mechanism engaging said coupling head and also engaging said plate for the purpose of normally holding said tubes in a predetermined position relatively to said coupling head.

6. The combination of a coupling head, guide rods pivotally connected therewith, brackets slidably engaged by said guide rods, springs engaging said brackets and connected with said guide rods for normally holding said guide rods in predetermined positions relatively to said brackets, and tubes extending through said coupling head for facilitating the passage of fluid bodies therethrough.

In testimony whereof I have signed my name to this specification in the presence of two subscribing witnesses.

FORREST RICHARD SHELDON.

Witnesses:
LAWRENCE F. GRADY,
SAM. S. BYERS.